United States Patent Office 2,976,121
Patented Mar. 21, 1961

2,976,121

PROCESSING OF CESIUM METAL CYANIDES

Oscar H. Koski, Richland, Wash., assignor to the United States of America as represented by the United States Atomic Energy Commission No Drawing. Filed Jan. 7, 1959, Ser. No. 785,543

4 Claims. (Cl. 23—184)

This invention deals with the recovery of cesium values and in particular with the processing of cesium metal cyanide precipitates.

Cesium, in particular $Cs^{137}$, which is one of the predominant fission products formed in the neutron irradiation of uranium, is a beta and gamma emitter of relatively constant strength on account of its long half-life (30 years) and as such has a great many uses. For instance, $Cs^{137}$ is used for food and drug sterilization, for the polymerization of organic hydrocarbons, for the production of mobile, high-voltage, low-current sources (atomic batteries), for teletherapy and for radiography.

Cesium is often recovered from the so-called waste solutions, which are solutions of neutron-irradiated uranium after the recovery of plutonium and uranium therefrom, by precipitation as a complex cyanide salt, such as nickel, cobalt or zinc ferrocyanide; zinc ferricyanide; or cobaltous, zinc, cadmium, nickel or ferrous cobalticyanide. These precipitation processes are satisfactory for the recovery of cesium; however, the complex salts obtained thereby are not too well suitable for the above-listed applications.

The complex cesium metal cyanides, although they are chemically stable, are not radiation-resistant. They decompose under the effect of their own radiation; the $C\equiv N$ bonds rupture which is recognizable from a pressure build-up. Furthermore, the cesium concentration in these complex cyanides is relatively low.

It has been contemplated to oxidize the complex cyanides with air and then to leach out the cesium values for subsequent conversion to a salt that contains the cesium in a higher concentration and that is radiation-stable. However, for this oxidation a temperature of at least 515° C. was necessary in order to obtain a quantitative reaction. This comparatively high temperature had the disadvantage that the reaction often proceeded explosively, this in particular when nitrate was present in the double cyanide. The cyanide salts are mostly precipitated from a nitrate solution, and insufficient washing of the precipitate results in the explosive cyanide-nitrate mixture. Another disadvantage of the oxidation was that free nitrogen was formed and that a large volume of non-condensable off-gas containing excess air and the nitrogen was formed from which practically no ingredients could be removed by scrubbing or condensation and that consequently extensive shielding was necessary for protection of the personnel from the radiation of the large volumes of radioactive gas. Still another drawback connected with this type of oxidation is the highly exothermic character and consequently the overheating in some parts of the reaction mass which, in turn, entails the volatilization of cesium oxide. Cooling with gas is not feasible on account of increased shielding requirements.

It is an object of this invention to provide a process for the conversion of complex cesium metal cyanides to a radiation-stable compound which does not involve an explosion hazard.

It is another object of this invention to provide a process for the oxidation of cesium metal cyanides which can be carried out at considerably reduced temperatures.

It is also an object of this invention to provide a process for the oxidation of cesium metal cyanides in which local overheating in the reaction mass is reduced to a minimum.

It has been found that certain oxides have a catalytic effect in the decomposition of the complex cesium metal cyanides so that oxidation with air, oxygen or a reducible metal oxide can be carried out at a reduced temperature. Oxides which have this catalytic property are cupric oxide, zinc oxide, aluminum oxide, mercuric oxide, ferric oxide and lead dioxide. All these oxides, in the case of air as the oxidizing means, bring about a conversion of the cesium metal cyanide to the cesium oxide at temperatures within the range of 150 to 360° C.

The process of this invention thus comprises grinding the complex cesium metal cyanide, mixing a catalyst oxide with the ground cyanide, heating the mixture preferably to a temperature between 150 and 360° C., leaching the reaction product thus obtained with water whereby a cesium hydroxide solution is obtained, and separating the cesium hydroxide solution from metal-oxides-containing residues.

The catalyst oxide is preferably added to the cesium metal cyanide in a quantity of from 3 to 10 moles per mole of the cyanide to be treated. The heating time necessary is dependent upon the catalyst used and, of course, upon the reaction temperature; it ranges from ½ hour to 5 hours. For instance, for a lead dioxide catalyst and a temperature of 315° C., heating for 30 minutes usually converts the cesium quantitatively to the oxide.

Instead of air, oxides, such as ferric oxide, mercuric oxide and/or lead dioxide, can be used, preferably in stoichiometric quantities.

The catalyst oxides have additional functions. Firstly, they act as a heat reservoir and thereby avoid overheating of the reaction mass during the highly exothermic reaction, and secondly, for some unknown reason they counteract the explosive characteristic of a nitrate-containing cyanide. Such mixtures were found to be explosive if the nitrate content was at least 0.3 gram per gram of cesium zinc ferrocyanide and the temperature was 310° C. or above. In one instance, for example, the addition of 4 grams of ferric oxide to each gram of cesium zinc ferrocyanide containing 4 grams of sodium nitrate made the otherwise exposive mixture harmless.

The cesium oxide obtained is leached out with water and the cesium hydroxide solution formed thereby is separated from a residue by means known to those skilled in the art, such as centrifugation, filtration or decantation. The catalyst oxide also assists in the separation of the solution by filtration.

The cesium hydroxide can then be converted to any salt desired, for instance to the chloride by adding hydrogen chloride to the solution and then evaporating the solution to dryness; or else the cesium hydroxide can be concentrated or evaporated to dryness first and then be reacted with hydrogen chloride. The conversion of the cesium hydroxide or oxide, as the case may be, to the chloride or other salt is not part of this invention, since this is within the skill of the art.

In the following an example is given to illustrate the process of this invention.

*Example*

Each of a number of oxides was mixed with cesium zinc ferrocyanide and the individual mixtures were heated slowly until reaction was detected. All of these experiments were carried out in the presence of air.

| Catalyst Oxide | Mole Ratio, Catalyst Oxide/ $Cs_2ZnFe(CN)_6$ | Temperature of Detectable Reaction, °C. |
|---|---|---|
| $Fe_2O_3$ | 9.5 | 150 |
| $Fe_2O_3$ | 3.41 | 150 |
| CuO | 3.45 | 160-260 |
| ZnO | 6.6 | 150-250 |
| $Al_2O_3$ | 5.3 | 150 |
| HgO | 6.5 | 170 |
| $PbO_2$ | 3.79 | 150 |
| None | | 515 |

As is obvious from the data of this table, the addition of from about 3 to 10 moles of catalyst per one mole of cesium zinc ferrocyanide brought about a radical reduction of the reaction temperature, the temperature in these cases ranging from 150 to 260° C. as compared with a reaction temperature of 515° C. when no catalyst was used.

It will be understood that this invention is not to be limited to the details given herein but that it may be modified within the scope of the appended claims.

What is claimed is:

1. A process of converting cesium values of a cesium double-metal cyanide to the oxide, consisting in grinding said cesium metal cyanide; adding a catalyst oxide to the ground cyanide, said catalyst oxide being selected from the group consisting of cupric oxide, zinc oxide, aluminum oxide, mercuric oxide, ferric oxide, lead dioxide and any mixture thereof; heating the mixture thus obtained in the presence of oxygen-containing material to a temperature of from 150 to 360° C.; leaching the reaction product with water whereby a cesium hydroxide solution is obtained; and separating the cesium hydroxide solution from a residue.

2. The process of claim 1 wherein from 3 to 10 moles of catalyst oxide per mole of cesium metal cyanide are added.

3. The process of claim 1 wherein the oxygen-containing material is air.

4. A process of converting cesium values of cesium zinc ferrocyanide to the oxide, consisting in grinding said cesium zinc ferrocyanide; adding from 3 to 10 moles of a catalyst oxide per mole of cesium zinc ferrocyanide, said catalyst oxide being selected from the group consisting of cupric oxide, zinc oxide, aluminum oxide, mercuric oxide, ferric oxide, lead dioxide and any mixture thereof; heating the mixture thus obtained in an atmosphere of air to a temperature of from 150 to 260° C.; leaching the reaction product with water whereby a solution of cesium hydroxide is obtained; and separating the solution from a residue.

References Cited in the file of this patent

UNITED STATES PATENTS

| 1,580,038 | Halvorsen | Apr. 6, 1926 |
| 1,979,151 | Fricke et al. | Oct. 30, 1934 |
| 2,769,780 | Clifford et al. | Nov. 6, 1956 |